United States Patent [19]

Ortolivo

[11] Patent Number: 5,676,092

[45] Date of Patent: Oct. 14, 1997

[54] SCRUBBING GLOVE FOR THE CLEANSING OF PET ANIMALS

[76] Inventor: Thomas V. Ortolivo, 2211 NW 41 Ave., Coconut Creek, Fla. 33063

[21] Appl. No.: 688,155

[22] Filed: Jul. 25, 1996

Related U.S. Application Data

[63] Continuation-in-part of Ser. No. 310,167, Sep. 21, 1994, which is a continuation-in-part of Ser. No. 210,438, Mar. 21, 1994, abandoned.

[51] Int. Cl.$^6$ .................................................. A01K 13/00
[52] U.S. Cl. ................................................................ 119/650
[58] Field of Search ................................. 119/650, 600, 119/612, 614, 615, 652, 664

[56] References Cited

U.S. PATENT DOCUMENTS

| | | | |
|---|---|---|---|
| 3,749,064 | 7/1973 | Weinstein et al. | 119/158 |
| 4,670,930 | 6/1987 | Lu | 15/118 |
| 5,009,195 | 4/1991 | Damm | 119/86 |
| 5,524,575 | 6/1996 | Lennon | 119/83 |

*Primary Examiner*—Thomas Price
*Attorney, Agent, or Firm*—M. K. Silverman

[57] ABSTRACT

A scrubbing glove for the washing and shampooing of pet animals includes a palm portion and separate finger portions, the glove and finger portions having one or more contact areas. The contact areas are covered with closely spaced resilient nubs comprising two orthonormal matrices disposed relatively diagonally to each other, a first matrix comprising higher resilient nubs, and a second matrix comprising lower resilient nubs, the higher nubs having a height relative to the pall and finger portions relative to the height of the lower nubs, in a range of about 1.5:1 to about 2.5:1, with a range of height of all nubs being between about 3 and about 20 millimeters.

8 Claims, 2 Drawing Sheets

SCRUBBING GLOVE FOR THE CLEANSING OF PET ANIMALS

REFERENCE TO RELATED APPLICATION

This case is a continuation-in-part of application Ser. No. 08/310,167, filed Sep. 21, 1994, entitled Glove for Washing Pets, which application is a continuation-in-part of Application Ser. No. 08/210,438, filed Mar. 21, 1994, now abandoned.

BACKGROUND OF THE INVENTION

The instant invention relates to a novel product for the washing, shampooing and general cleansing of household pets having a fur coat.

At the present, the washing and shampooing of household pets is an arduous and imprecise task which is done by hand. Despite the degree of effort applied to the task, there is no certainty that fleas and larvae have been fully removed from the fur and skin of the pet animal. Further, the risk or dermatitis exists, resultant from contact with chemicals used in the washing process, if a scrubbing glove is not used.

Those scrubbing gloves that have been set forth in the prior art are less than suitable for use with most animals because of the inclusion in such gloves of common scrubbing surfaces which, in addition to their limitations in effective removal of fleas and larvae, often operate to scratch and damage the skin of animals.

The present invention clearly defines over the known prior art, namely, U.S. Pat. No. 2,167,226 to Wells and U.S. Pat. No. 5,214,799.

The instant invention is, as well, an improvement over the invention set forth in my pre-existing Application Ser. No. 08/210,438 and 08/310,167 in that I have improved upon the geometric structure of the matrix of resilient protrusions, more fully described below, of the scrubbing glove of the instant invention.

SUMMARY OF THE INVENTION

The present invention relates to a scrubbing glove for the washing and shampooing of pet animals. The glove includes a palm portion and separate finger portions, said glove portion having one or more palm contact areas, said palm contact areas and contact areas of said finger portions covered with closely spaced resilient nubs comprising two orthonormal matrices disposed relatively diagonally to each other, a first matrix thereof comprising higher resilient nubs, and a second matrix thereof comprising lower resilient nubs, said higher nubs having a height relative to said palm and finger portions relative to the height of said lower nubs, in a range of about 1.5:1 to about 2.5:1, with a range of height of all nubs being between about 3 and about 20 millimeters.

It is an object of the invention to provide a scrubbing glove adapted to protect not only the user, but to enable one to accomplish a highly effective cleaning of a pet animal, this including the removal of fleas and larva from the hair filaments of the coat thereof to reduce hair tangles.

It is another object to provide a scrubbing glove of the above type that will reduce the labor involved in the effective scrubbing and cleansing of a pet animal.

It is another object of the invention to provide a glove of the above type that will minimize the risk of dermatitis due to contact with pet cleaning chemicals.

The above and yet other objects and advantages of the present invention will become apparent from the hereinafter set forth Brief Description of the Drawings, Detailed Description of the Invention and claims appended herewith.

DETAILED DESCRIPTION OF THE INVENTION

A glove 10 of this invention fits over each finger in the palm of the hand. Each finger protrusion 12 is covered on a palm side 14 thereof by closely spaced short protrusions or nubs (more fully described below) which are made of a flexible material such as rubber. These nubs have a height in the range of about three to about 20 millimeters, with shorter nubs thereof used for scrubbing and longer length nubs used for combing of animal hair.

The glove 10 (see FIG. 1) may be made as an integral molded rubber sleeve, covering the entire hand to the wrist, in which the nubs comprise a part of the glove. In another variation, there may be provided a glove whose palm face is covered with a rubber sheet in which said sheet is then shaped in the form of fingers and of palm and which includes closely spaced protrusions (having a geometry, position and density described below). Such a sheet can be adhered to the glove to provide a product having the same configuration as integral modeled rubber glove. Also, the term rubber as used in the specification is intended to include any elastomeric, this including without limitation natural rubber, synthetic rubber, thermoplastics, elastomeric polymers such as SANTOPERENE (a trademark of the Monsanto Company) and GEON CIM Vinyl (a trademark of B. F. Goodrich Company).

Figure 3:
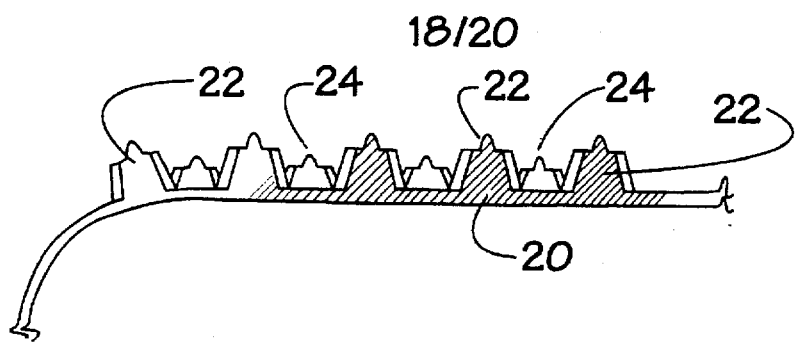
FIG. 3 is a side cross-sectional view of the top plan view of FIG. 2.
Figure 1:
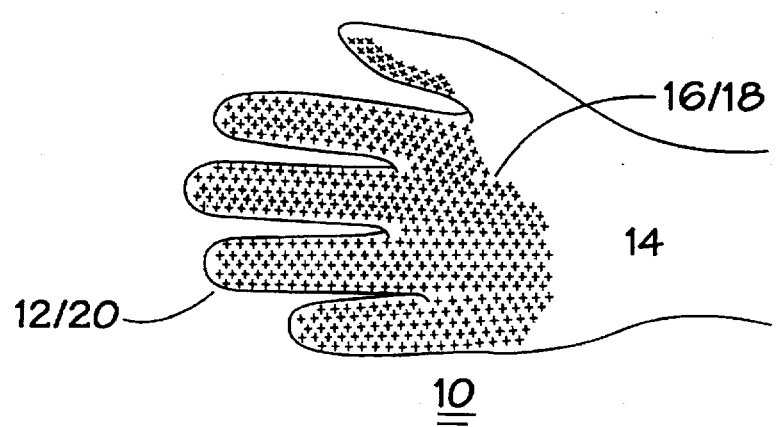
FIG. 1 is a diagrammatic view of a molded right hand glove, shown form the palm side thereof, constructed in accordance with the present invention.

In FIG. 1, the instant scrubbing glove 10 may be seen to include a palm portion 16 and said separate finger portions 12. The palm portion 16 may be provided with one or more palm contact areas and, correspondingly, said finger portions 12 are provided with contact surfaces 20. See FIGS. 2 and 3.

As may be noted in said figures, there are provided two matrices of relatively diagonally spaced alternatively higher and lower resilient nubs 22 and 24. The ratio of the height of the higher to the lower nubs may be in a range of 2.5:1 to 1.5:1 with about 2:1 being preferable. Within such ratio, the lower nubs are typically 6 to 13 mm in height, while the higher nubs are 12 to 20 mm.

The nubs or protrusions 22 and 24 are spaced at a density of approximately 20 to 30 per square inch, or about 3 to 5 per square centimeter. Further, the base width of each nub is about ⅛ to ¼, inch or about 3 to about 7 millimeters.

Further, as may be noted in FIGS. 2 through 5, each nub is provided with an integral fin structure 26. As may be seen in FIGS. 2, 4 and 5, the fins of the fin structure 26 are substantially orthonormal to each other, that is, two respectively diagonal Cartesian coordinate systems are definable by said fin structures. It is, more particularly, to be noted that a bottom of each fin is integral with finger surface 20 or, in the case of the nubs upon palm contact surface 18, integral with the palm portion 14 of glove 10. It is noted that each fin reduces in dimension as a function of increase in height of its corresponding nub. Accordingly, the length of each fin is greatest at nub base 28 and is least at top 30 of each nub.

Figure 2:
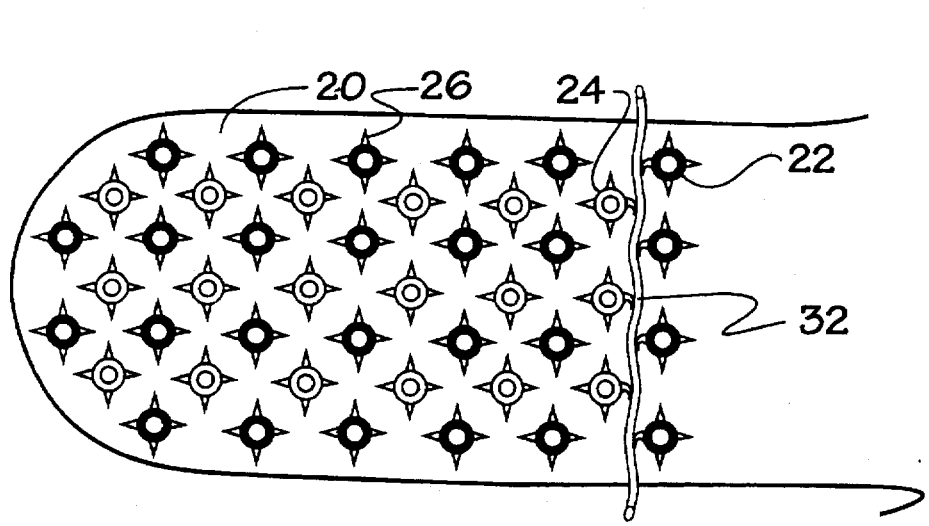
FIG. 2 is a top plan view of the diagonally disposed scrubbing matrices of higher and lower resilient nubs, as they exist on the scrubbing surface of one palm side finger of the invention, but which matrix is representative of all palm contact areas in accordance with the invention.
Figure 4:
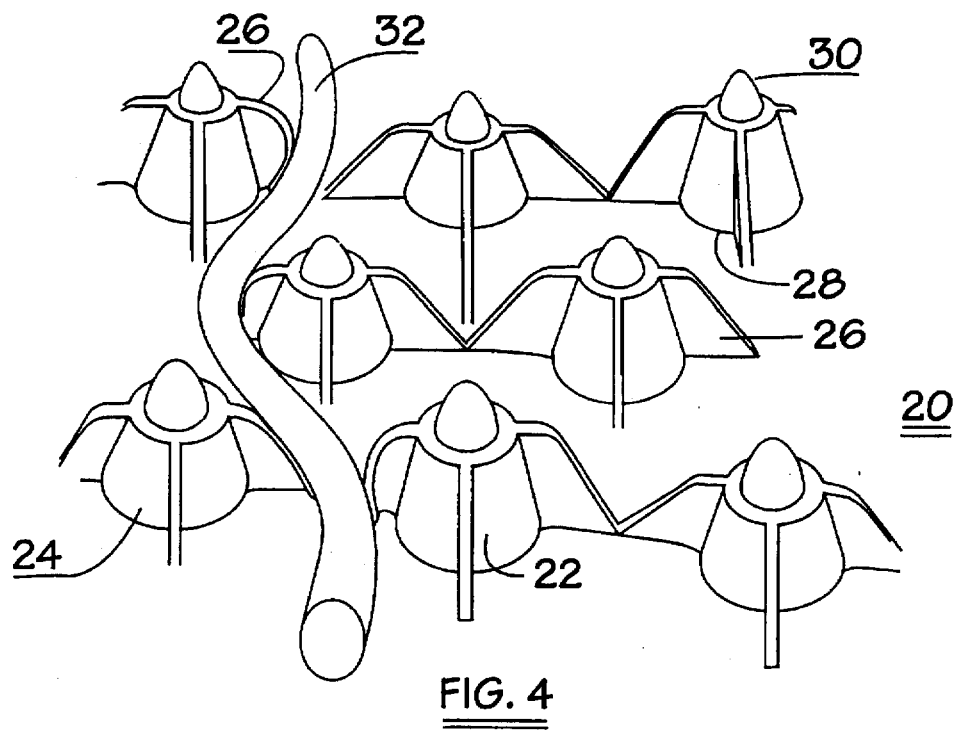
FIG. 4 is an enlarged diagonal perspective view of the nub matrices shown in FIGS. 2 and 3.
Figure 5:
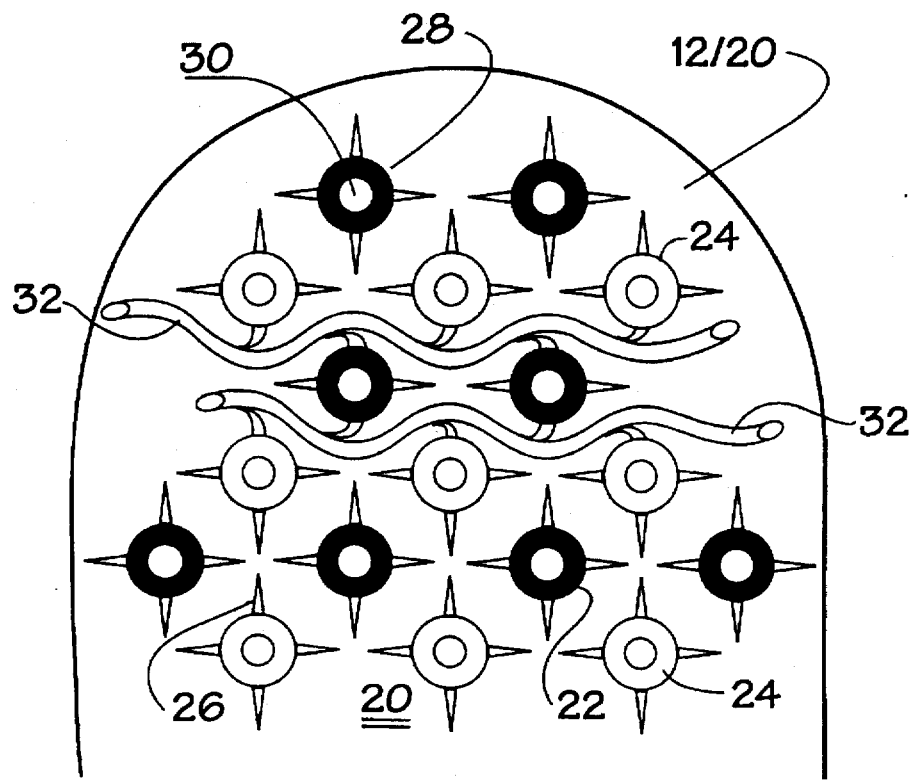
FIG. 5 is an enlarged view of a part of the matrices shown in FIGS. 2 through 4, showing the operation of the fin structure associated with each nub.

With reference to the views of FIGS. 2, 4 and 5, the cleaning function effected by fins 26 relative to a filament 32 of fur of the pet animal may be seen. More particularly, the fins 26 of both nubs 22 and 24 scrape against filaments 32 to thereby accomplish the removal of fleas and larvae from the hair filaments. It has been found that this beneficial effect is achieved as a result of spacing of the nubs, at the density above set forth, and of the use of fins 26 having sufficient length and location so that no filament 32 can pass between any adjacent pair of nubs without the fins effecting a scraping function thereagainst.

With respect to the function of the higher nubs 22 versus the lower nubs 24, it has been found that the higher nubs have particular utility in the grooming of the pet animal, this is particularly the case with long haired pets such as a dog, while the lower nubs 24 are of particular utility in accomplishing a quick and thorough shampooing of the pet animal.

As may be seen in the view of FIG. 2, one orthonormal matrix of higher nubs 22 is diagonally arrayed relative to the other orthonormal matrix comprising the lower nubs 24, all of which nubs are provided with the above-described fins 26.

In view of the above, there is provided a scrubbing glove for the cleansing of pet animals which effectively addresses the many limitations of the prior art set forth in the Background of the Invention above.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the claims appended herewith.

Having thus described my invention what I claim as new, useful and non-obvious and, accordingly, secure by Letter Patent of the United States is:

1. A scrubbing glove for the washing and shampooing of pet animals, the glove comprising:

a palm portion and separate finger portions, said glove portion having one or more palm contact areas, said palm contact areas and contact areas of said finger portions covered with closely spaced resilient nubs comprising two orthonormal matrices disposed relatively diagonally to each other, a first matrix thereof comprising of higher resilient nubs, and a second matrix thereof comprising of lower resilient nubs, said higher nubs having a height relative to said palm and finger portions relative to the height of said lower nubs, in a range of about 1.5:1 to about 2.5:1, with a range of height of all nubs being between about 3 and about 20 millimeters.

2. The scrubbing glove as recited in claim 1, in which each of said higher and lower nubs comprise a substantially orthonormal fin structure integral with palm and finger surface situated nubs of said glove.

3. The scrubbing glove as recited in claim 2, in which a height, relative to a major axis of each of said nubs, of said fins decreases from a base of each fin to a top portion of each nub.

4. The scrubbing glove as recited in claim 3, in which each of said nubs defines a substantially conical geometry defined by a surface of rotation about said major axis in which a base of each nub is integral with a palm or finger portions of said glove.

5. The scrubbing glove as recited in claim 3, in which said protrusions are spaced at a surface density of between about three and about five protrusions per square centimeter.

6. The scrubbing glove as recited in claim 5, in which a base diameter of each protrusion defines a range of about three to about seven millimeters.

7. The scrubbing glove as recited in claim 3, in which said protrusions comprise integral molded polymeric material.

8. The scrubbing glove as recited in claim 3 in which the height of each higher nubs comprises a range of about 13 to about 20 mm, and the height of each nub comprises a range of about 6 mm to about 13 mm.

* * * * *